(12) United States Patent
Buache

(10) Patent No.: US 11,175,882 B2
(45) Date of Patent: Nov. 16, 2021

(54) PORTABLE SYSTEM FOR PROCESSING AUDIO SIGNALS FROM MULTIPLE SOURCES

(71) Applicant: TYXIT SA, Echichens (CH)

(72) Inventor: Raphael Buache, Baulmes VD (CH)

(73) Assignee: TYXIT SA, Echichens (CH)

(*) Notice: Subject to any disclaimer, the term of this patent is extended or adjusted under 35 U.S.C. 154(b) by 119 days.

(21) Appl. No.: 16/697,635

(22) Filed: Nov. 27, 2019

(65) Prior Publication Data
US 2020/0174742 A1 Jun. 4, 2020

(30) Foreign Application Priority Data
Nov. 30, 2018 (EP) .................................. 18209691

(51) Int. Cl.
| | | |
|---|---|---|
| G06F 3/16 | (2006.01) |
| H04M 1/60 | (2006.01) |
| H04R 3/00 | (2006.01) |
| H04R 5/033 | (2006.01) |
| H04R 5/04 | (2006.01) |
| H04R 27/00 | (2006.01) |

(52) U.S. Cl.
CPC .......... *G06F 3/165* (2013.01); *H04M 1/6066* (2013.01); *H04R 3/00* (2013.01); *H04R 5/033* (2013.01); *H04R 5/04* (2013.01); *H04R 27/00* (2013.01); *H04R 2227/003* (2013.01); *H04R 2420/07* (2013.01)

(58) Field of Classification Search
CPC ........ G06F 3/165; H04M 1/6066; H04R 3/00; H04R 5/033; H04R 5/04; H04R 27/00; H04R 2227/003; H04R 2420/07; H04H 60/04
See application file for complete search history.

(56) References Cited

U.S. PATENT DOCUMENTS

| | | | | |
|---|---|---|---|---|
| 5,834,671 | A | * | 11/1998 | Phoenix .................. G10H 3/182 84/645 |
| 10,001,968 | B1 | * | 6/2018 | Slick ........................ G06F 3/165 |
| 10,454,982 | B1 | * | 10/2019 | Slick ........................ G10L 19/00 |
| 2010/0303260 | A1 | * | 12/2010 | Stieler Von Heydekampf ............ H04H 60/04 381/119 |
| 2014/0064519 | A1 | * | 3/2014 | Silfvast ................... H04H 60/04 381/119 |
| 2015/0139440 | A1 | * | 5/2015 | Crawford ............. G10H 1/0083 381/77 |
| 2017/0063584 | A1 | * | 3/2017 | Taniguchi ................ H04B 1/16 |
| 2017/0346581 | A1 | * | 11/2017 | Leopardi .................. H03G 9/12 |
| 2017/0351483 | A1 | * | 12/2017 | Holdren ............... G11B 27/038 |
| 2017/0359135 | A1 | * | 12/2017 | Stadius .................... H04R 3/04 |
| 2017/0364321 | A1 | * | 12/2017 | Chavez .............. G06F 3/04847 |

(Continued)

*Primary Examiner* — Jeffrey Donels
(74) *Attorney, Agent, or Firm* — Maschoff Brennan

(57) ABSTRACT

A personal monitoring system for musicians playing in a group situation, wherein each musician is allowed to change his or her own personal mix audio signals coming from the other musicians and the sound of his or her own instrument. Each musician has a personal mixer which can receive audio signals wirelessly from the remaining musicians in the group. The mixer also has a wired input for receiving the audio signal from the musician's own musical instrument. The mixer may also be configured to receive mix control commands from a mobile wireless controller device operated by the musician.

15 Claims, 1 Drawing Sheet

(56) References Cited

U.S. PATENT DOCUMENTS

2020/0184983 A1* 6/2020 Cengarle .............. H04N 21/439
2020/0236456 A1* 7/2020 Gallo ................... H04R 1/1041
2020/0272408 A1* 8/2020 Rubin .................... G06F 3/162
2020/0372468 A1* 11/2020 Lane ................. G06Q 30/0239
2021/0152908 A1* 5/2021 Aviv ....................... H04R 5/04

* cited by examiner

PORTABLE SYSTEM FOR PROCESSING AUDIO SIGNALS FROM MULTIPLE SOURCES

CROSS-REFERENCE TO RELATED APPLICATIONS

This application claims priority from European Patent Application No. 18209691.7, filed on 30 Nov. 2018. This application is herein incorporated by reference in its entirety for all purposes.

TECHNICAL DOMAIN

The inventive concepts described herein relate generally to the domain of the monitoring of audio signals and find particular use in a wireless in-ear monitoring system for musicians in a group environment.

BACKGROUND

In a public performance situation, electronic audio signals representing the sounds being produced by a group of performing musicians are usually sent to a front-of-house mixing desk to be processed and then amplified and projected to the audience via loudspeakers. The musicians also need to be able to hear the sound that they are producing, and so monitors are usually provided for the musicians for this purpose. The monitors may be fixed monitors placed on stage facing the musician or so called in-ear monitors, which fit directly in or around the musician's ear and which generally have a wireless receiver. The sound being fed to the monitors may be mixed by a technician using the front-of-house mixing desk, or a dedicated monitor mixing desk, to route a mix of different sound channels back to the stage monitors or to the wireless receiver of the in-ear monitors. Whenever a musician wants to change the mix, for example by making his or her own instrument louder or softer or making another instrument louder or softer, the appropriate instructions need to be communicated to the technician, who then has to accurately implement those instructions. This communication sometimes goes wrong and may leave the musician in an uncomfortable situation and possibly lead to a sub-optimum performance of the music.

Wireless monitoring systems are known, where each musician has an in-ear monitor with a wireless receiver. The wireless receiver has an input for receiving multi-track audio from a central mixing desk or pre-mixing desk. The wireless receiver also has a control input for receiving control commands to alter the mix of the audio channels. The control commands may come from a portable controller such as a smart phone or a tablet computer. The drawback of this system is that latency is introduced due to the wireless communications network. This latency results in a delay between the sound a musician is producing and the sound returned to the monitor, which is disturbing to the musician and may prevent the musician from performing correctly.

United States Patent Application publication number US20100303260 A1 discloses a decentralized audio mixing and recording system comprising one or more decentralized mixers with audio inputs for one or more local audio input signals, a network adapter to connect to a network for receiving one or more mix busses from one or more other mixers on the network. The mixer further comprises a DSP for creating a local mix of the local audio input signal combined with the mix busses from the network. It is also possible to record the local mix or the raw signals from the mix busses and the local audio input(s). The connection to the network may be a wired connection, over which the local audio signal may be sent to the network and the separate mix busses may be received from corresponding further decentralized mixers in the system. The wired networks are generally packet-based networks. Examples of such wired networks include those which operate according to standards such as Ethernet, Fast Ethernet 100 BASE-T with Ethernet Audio Video Bridging (AVB) in accordance with an Institute of Electrical and Electronics Engineers (IEEE) standard such as IEEE 802.1, IEEE 802.1ak, IEEE 802.1 AB, IEEE 802.1AS, IEEE 802.1D, IEEE 802.1Q, IEEE 802.1Qat, IEEE 802.1Qav, Universal Serial Bus (USB), IEEE 1394. The document mentions that the network connection may otherwise be a wireless connection, operating in compliance with one or more wireless standards such as IEEE 802.11a, IEEE 802.11b, IEEE 802.11g or IEEE 802.11n, for example. As in the embodiments featuring a wired network connection, embodiments in which the communication with the network is via a wireless connection, the network is of a packet-switched type and the mix busses from each of the mixers in the network are therefore directly available as separate signals in the network. It is worth noting that in any of the above embodiments, some kind of addressing has to be included to indicate which packets belong to which destination or source. Some kind of coding is needed, for example somewhere in the network itself, in order to perform the necessary decoding to provide the correct signals for each mixer. The network may even be described as a decoding network. The decoder also needs to be aware of which mixers are present in the network in order to be able to provide the necessary decoding. Consequently, such a system cannot be said to be entirely "decentralized".

United States Patent Application publication number US20140064519 A1 discloses a distributed self-scaling network audio processing system. The system includes end nodes interconnected via a packet-switched wired or wireless network, each node operating as a peer on the packet-switched network on which each of the audio outputs of the nodes are made available. Each of the end nodes supports local input processing, mixing, and output processing. The input processing includes the option of dual input channels for supporting separate front-of-house and monitor workflows. End nodes are added to the system to support specific audio processing applications, based on the number of audio sources, the number of output mixes required, and the number of locations from which users choose to interact with the system. The system relies on Ethernet and IEEE Audio Video Bridge Standards, making exclusive use of packet-based network communication techniques.

BRIEF SUMMARY

Embodiments disclosed herein provide a musician with the capability of easily adjusting their own monitor mix according to their personal preferences with regard to the relative volumes of the different instruments playing or the general volume of the monitor output or any effects on either the general output or on one or more of the instruments, such as equalising and/or audio effects. Such monitoring may find use in a live concert environment, a practice environment or a studio recording environment where musicians may be isolated from each other acoustically. In order for each musician to be able to perform correctly, he or she needs to be able to adjust their own monitor mix to allow all instruments to be heard correctly.

A goal of some of the embodiments disclosed herein, among others, is to provide a wireless monitoring system to allow a group of musicians in a live performance situation to receive the sound of each musician's own instrument as well as the remaining musicians' instruments, thus allowing each musician in the group to adjust his or her own mix in a decentralized manner.

According to a first aspect, there is disclosed herein a personal audio processing assembly for processing a plurality of audio signals from a plurality of sources the plurality of audio signals including wireless broadcast audio signals and at least one direct audio signal from the user via at least one wired connection, and for providing a combined audio output signal to a user, the personal audio processing assembly comprising:

a wireless receiver for receiving the wireless broadcast audio signals;

an auxiliary audio interface configured to receive a wired input the at least one direct audio signal from the user;

a wireless transmitter configured to transmit the at least one direct audio input signal to at least one other user as part of the wireless audio signals;

a communications controller configured to control at least the wireless receiver and the wireless transmitter according to a pre-determined communications protocol, the communications controller further configured to control the wireless receiver to exclude the at least one direct audio input signal transmitted by the wireless transmitter from the audio signals sent to the processor by the wireless receiver;

a processor configured to process the audio signals from the wireless receiver and the auxiliary audio interface according to one or more received control instructions to provide a processed output that includes the at least one direct audio input signal and the audio signals received wirelessly form other sources; and an audio output interface configured to provide the processed output as the combined audio output signal to the user.

The personal audio processing assembly described above thus can be called a radio transceiver since it may comprise both a radio transmitter 322 and a radio receiver 311 in the output interface 320 and the input interface 310, respectively. In more general terms, the personal audio processing assembly may also be referred to as a wireless communications module.

According to a second aspect, there is described a system for providing each member of a group of musicians with a capability of receiving, mixing and hearing a combination of audio signals from every other member of the group and his or her own instrument, the system comprising, for each member, a personal audio processing assembly described above.

According to a third aspect, a method is disclosed, for providing a personalized mix of a plurality of audio signals from a plurality of sources. The method uses a personalized audio processing assembly as described above, and involves receiving mixing instructions from a user, mixing in the processor the plurality of audio signals based on the mixing instructions from the user, the wireless broadcast audio signals being received on a plurality of data channels, each data channel comprising audio content from one of the sources, wherein said at least one direct audio input signal transmitted by the wireless transmitter is excluded from the audio signals processed by the processor to provide the processed output to the user as a combined audio output signal.

BRIEF DESCRIPTION OF THE DRAWINGS

The inventive concepts described herein will be better understood thanks to the detailed description which follows and the accompanying drawings, which are given as non-limiting examples of embodiments of the inventive concepts, namely.

DETAILED DESCRIPTION

Embodiments described herein provide for personal mixing of audio signals from multiple sources, allowing musicians playing in a group environment, either in a concert setting, a rehearsal situation or a recording configuration, to each be able to receive and personally mix the sound from their own instrument and the instruments of the rest of the musicians in the group in an in-ear monitor.

Figure 1:
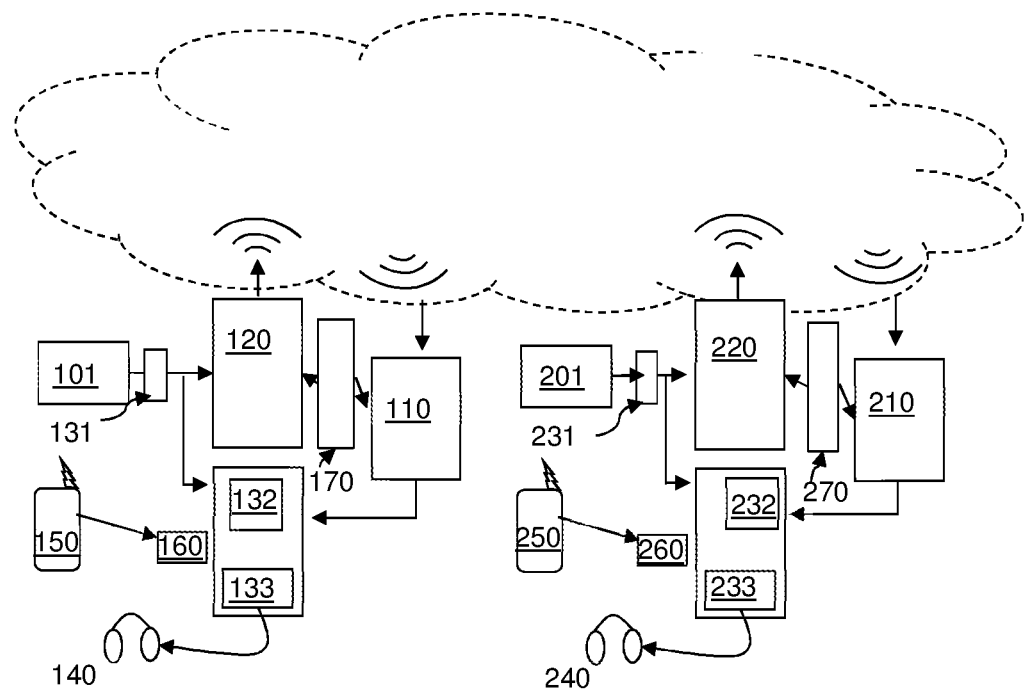
FIG. 1, illustrating a working environment within which a personal audio processing assembly according to an embodiment of may be deployed.

FIG. 1 shows a scenario in which an embodiment may be deployed. A group of musicians produce audio signals using their instruments 101, 201. The audio signals may be produced either directly, using an electronic instrument such as a keyboard, synthesizer or sequencer for example, or indirectly using an acoustic instrument such as a voice, a saxophone, a drum kit or a guitar, along with a transducer such as a microphone or a pick-up to convert the acoustic sound or mechanical vibrations of the instrument to an electronic audio signal. Each instrument may produce one or more audio signals, for example in the case of an electric piano there may be left and right audio signals forming part of a stereo signal, or a drum kit may have four or five microphones for each of the different elements of the kit, which means that the drum kit provides four or five audio signals.

Some embodiments use radio transmission and reception techniques to allow multiple users, musicians in a group for example, to communicate via a same physical radio frequency channel. Preferably, digital radio techniques are used to allow a plurality of users to share the same radio frequency channel. The radio frequency channel carries a number of encoded or multiplexed audio signals. Thus, it is said that the audio signals are digitally modulated to allow a plurality of audio tracks or channels of audio signals to be incorporated into the same physical radio frequency channel. This is known as the broadcast signal.

In some embodiments of the present invention, radio broadcast signals are preferred over packet-based data communication techniques. In packet-based networks, packets may be dropped from time to time for various reasons, whereas this is not the case when using radio broadcast techniques. This allows for more precision and higher resolution as well as better signal headroom for a transmitted audio signal compared to packet-based transmission, where error concealment digital processing techniques have to be used to compensate for such packet loss. This results in high quality and robust audio transmission.

Any of the known modulation techniques may be used, such as Frequency Division Multiple Access (FDMA), Orthogonal Frequency Division Multiple Access (OFDMA), which can be regarded as being a particular type of FDMA, Time Division Multiple Access (TDMA) or Code Division Multiple Access (CDMA). In the FDMA techniques the physical radio frequency channel is divided into several smaller sub-channels. Instead of splitting the radio frequency channel into sub-channels, TDMA provides for the channel to be split into different time-slots, with each participant being allocated a particular slot. Each party transmits during its allotted time-slot and may receive during the other time-slots. Another known modulation technique which can be said to be time-slot based is Ultra Wide Band Modulation (UWB), used in impulse radio protocols, in which the presence or absence of a pulse within a time slot serves as an information medium. In CDMA, unique codes each corresponding to their respective parties is used to define the slots, as opposed to time slots or frequency slots.

With respect to FIG. 1, each of the musicians may be provided with: an output interface 120, for transmitting the audio signal of their own instrument to become part of a radio broadcast signal; and an input interface 110 for receiving the radio broadcast signal. According to an embodiment, the audio signals from their own instruments may be encoded before being transmitted. The encoding may be done by an encoder unit and a wireless transmitter may be used to transmit the encoded signal. According to one embodiment, the encoder unit may be within the same hardware module in which the transmission module is comprised. Both of these blocks may be included in the output interface. Since each musician contributes to the broadcast signal and each musician can receive the broadcast signal, each musician's personal audio processing assembly has access to the audio signals from the rest of the musicians in the group and the audio signal produced by his or her own instrument. In some embodiments, the output interface and input interface may form part of a single transceiver unit. The transmitted signal may be an encoded signal, for example a modulated signal, which may be multiplexed according to a time domain multiple access protocol (TDMA) or any other protocol based on time slot allocation. Other protocols are also possible, for example where different audio channels are allocated different frequency sub-bands within the radio broadcast signal or different code slots. For increased flexibility, different combinations of any of the different modulation techniques may also be used, such as a combined FDMA and TDMA technique or a combined TDMA and CDMA technique. The received signal may be decoded into a plurality of audio channels or tracks each comprising one of the audio signals. According to all embodiments of the invention, the audio signal from each musician's own instrument is excluded from the thus decoded audio signals. This is achieved through the use of a communications controller 170, 270 which controls the operation of the input interface and the output interface according to the chosen communications protocol.

In some embodiments in which the radio broadcast signal adheres to a time division multiple access communications protocol, a means of filtering the direct audio input from a particular user's own audio processing assembly can be said to result from the protocol itself, as implemented by the communications controller. The personal audio processing assembly comprises a communications controller to control the operation of the input interface and of the output interface to adhere to the communications protocol. The communications controller therefore performs the filtering and can be said to provide the means of filtering the direct audio input from the remaining audio signals in the radio broadcast signal. For example, although when analysed over a sufficiently long time the radio broadcast signal comprises the user's own audio signal and the audio signals of the other users, at a given time when the user's assembly is receiving the broadcast signal, the transmission module of the assembly is not transmitting and so the received signal automatically excludes the user's own audio signal. Similarly, with other protocols it is convenient to arrange, via the protocol itself as controlled by the communications controller, for the user's equipment to receive only the audio signals of the other users, thereby effectively filtering out the audio signal from his or her own instrument. It can therefore be said, depending on how the protocol is implemented, that the filtering is provided by the communications controller.

All embodiments comprise a communications controller configured to control at least the input interface and the output interface according to a pre-determined communications protocol. The processor receives the at least one direct audio input signal and a remaining subset of the plurality of audio signals, received from the radio broadcast signal, the remaining subset excluding the at least one direct audio input signal. The communications controller thereby acts as a filter to ensure that the remaining subset of the plurality of audio signals excludes the at least one direct audio input signal transmitted by the output interface.

The input interface may simply be called a wireless receiver for receiving the wireless broadcast audio signals and the output interface may simply be called a wireless transmitter configured to transmit the direct audio input signal or signals to at least one other user as a part of the wireless audio signals. In this case it can be said that the communications controller is configured to control at least the wireless receiver and the wireless transmitter according to a pre-determined communications protocol, the communications controller being further configured to control the wireless receiver to exclude the at least one direct audio input signal transmitted by the wireless transmitter from the audio signals sent to the processor by the wireless receiver.

Each musician's audio processing assembly also includes a processing unit 132, 232, or processor, which may be for example a multi-channel audio mixer to process or otherwise mix the audio signals received in the radio broadcast. Processing may include adjusting the relative volumes of the different audio channels, altering the EQ of one or more of the channels or adding audio effects to one or more of the audio signals, as well as combining the channels to provide an audio output for the musician, for example. Processing may also include altering the volume of the audio output or adding an effect to the audio output. According to an embodiment, the processor is a DSP.

The audio signal from each musician's own instrument may be input to the processor via an auxiliary audio input module 131, 231 by a direct hardwired input from the instrument or transducer output. The auxiliary audio input module is known as an auxiliary audio interface. Thus, the musician is able to control the processor to adjust different parameters of different channels of audio signals, including the audio signal from his or her own instrument, to provide a customized mix of all the instruments in the group for monitoring through his or her earpiece or headphones. In embodiments where the encoder unit is not comprised within the same hardware in which the output interface 120, 220, 320 is comprised, the encoder unit, or encoder, may be comprised within the auxiliary audio input module 131, 231, or it may be a unit on its own, between the auxiliary input module and the transmitter.

In order to maintain a high-quality and robust audio output to the user, the personal audio processing assembly is configured to operate using radio broadcast signals rather than a packet-based communications network such as a LAN.

In all embodiments, since the characteristics of the radio broadcast signal are well known, high quality results are achieved when filtering of the musician's own instrument from the received broadcast signal is done under control of the communications controller in the personal audio processing assembly, for example, by the input interface or by a decoder of the personal audio processing assembly or by a combination of any of the aforementioned.

According to different embodiments the processing unit, or processor, may be controlled by receiving control instructions via a control interface 160, 260 having buttons, knobs or sliders or other such controllers accessible by the musician for altering different parameters to affect the sounds of the different channels of audio signals. The controllers may be hardware elements or may be software-generated controllers displayed on a touch-sensitive screen. Alternatively, a separate portable controller device may be programmed to send the control instructions wirelessly to the mixer for adjusting the different parameters. Suitable wireless communications protocols for sending control instructions are short-range wireless protocols such as Bluetooth or NFC for example. Suitable control devices include smart phones or tablet computers for example. Alternatively, control instructions for modifying the parameters may be provided to the mixer within the encoded radio signal broadcast. For example, in a digital radio protocol where headers and content packets are used, the control instructions may be incorporated into the header. In this manner a technician may generate control instructions using a terminal with a transmitter to include the instructions in the broadcast radio signal, thus causing any or all of the musicians' mixers to process their received audio signals in a particular way. Each of the musicians could also affect the mix of any or all of the other musicians' monitors in a similar way using information in the header.

Figure 2:
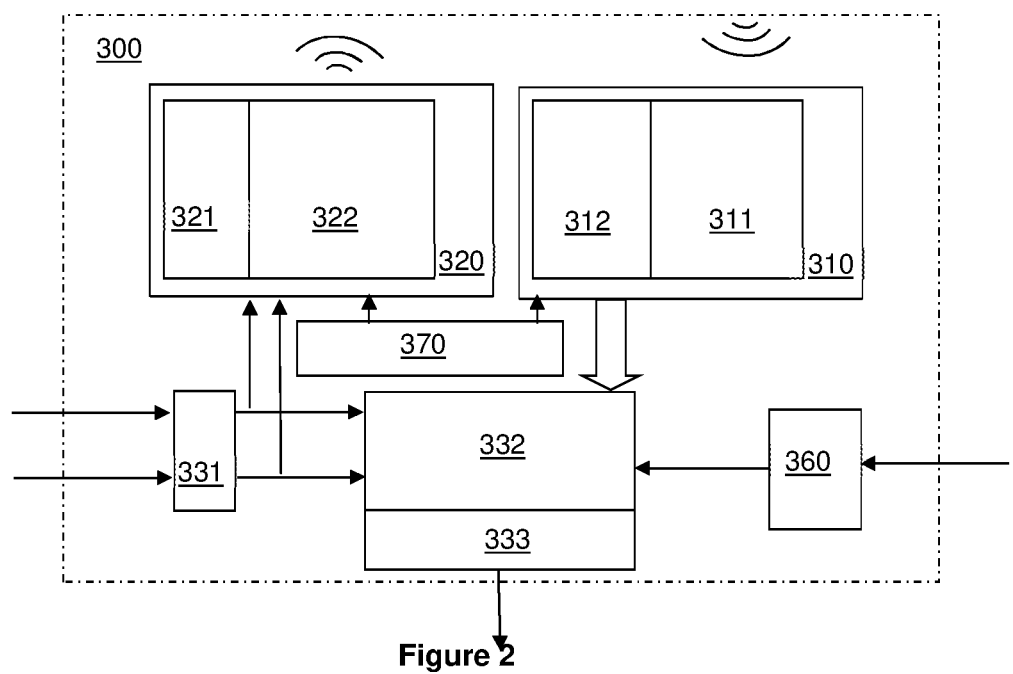
FIG. 2, showing a personal audio processing assembly according to an embodiment disclosed herein.

FIG. 2 shows various blocks of a personal audio processing assembly 300 according to an embodiment, which may be deployed in a system according to an embodiment of another aspect of the present invention, thus allowing for the provision of personalized monitoring to a musician in a group setting. A personal audio processing assembly such as this would be made available to each musician in the group setting. The working environment in which the personal audio processing assemblies are deployed does not require a centralized mixing desk for receiving the sound form the participating musicians, mixing the received sound and dispatching the mixed sound back to the musicians. Instead, each musician's equipment is configured to broadcast the audio signal from the respective musician's instrument or transducer to form part of a broadcast radio signal which is made available directly to all of the remaining musicians' equipment. It may therefore be said that the mixing or processing function is decentralized.

The personal audio processing assembly 300, according to an embodiment, can be said to form a personal multi-channel audio mixer and may be housed in a single unit, preferably a portable unit which can be worn by the musician or conveniently placed close to the musician. Alternatively, various different sub-modules may be housed in different units for convenient deployment wherever the sub-modules are required. For example, a transmission module could conveniently be housed within a microphone unit or similar transducer unit in an instrument. An input interface may be housed in a head-set unit. An output interface may comprise an encoder 321, or encoding unit, and a transmitter 322. An input interface may include a decoder 312 and a receiver 311, and so on.

According to an embodiment, with reference to FIG. 2, a wireless communications module is provided. The wireless communications module may comprise an input interface 310, configured to receive a radio broadcast signal, encoded according to a pre-determined wireless communications protocol. The input interface may comprise a decoder in some embodiments, the decoder is configured to decode one or more audio signals from the equipment used by the rest of the musicians in the band into one or more corresponding separate audio channels for later mixing or otherwise processing. According to a particular embodiment, the communications module may be a transceiver. In such an embodiment, the transceiver may be further configured to encode an audio signal received from the musician's own instrument and to transmit the encoded signal to become part of the radio broadcast signal. In other embodiments a separate module may be provided comprising an encoder 321 to encode the audio signal from the musician's own instrument according to the communications protocol and a transmitter 322 to transmit the thus-encoded signal to become part of the radio broadcast. In all embodiments an output interface is provided for transmitting the direct audio input signal from the user's own instrument to become part of the radio broadcast signal. FIG. 2 shows an example where the output interface has two audio inputs for receiving two audio signals from the instrument. This is suitable for instruments such as an electronic piano for example, with left and right outputs.

The personalised audio processing assembly comprises a communications controller 370 to control the input interface and the output interface to operate according to a pre-determined communications protocol. In embodiments where the communications protocol for the radio broadcast of the audio signals is a time-slot based protocol, such as the TDMA protocol, the transceiver, or personalised audio processing assembly, may be configured to cause the input interface to monitor the radio signal in order to know when it is allowed to transmit and to control the output interface to transmit at the appropriate time. The transceiver is a virtual module comprising at least the output interface and the input interface, which may further include an encoder and/or a decoder.

A sound processing unit or audio mixer 332, otherwise known as a processor, is provided and is configured to process the audio signal received from the musician's own instrument and the decoded audio signals from the rest of the musicians of the group. Processing may include for example, adjusting the level of the different audio signals with respect to each other, adding sound effects to one or other of the audio signals, adjusting the general level of the processed or otherwise mixed output, and so on. The mixed output is provided, via an output module 333 to be made available for the musician via an earplug, earphones or a headset, for example.

According to some embodiments, the audio signal, or signals, from the musician's own instrument is received directly into the processing unit 332, instead of being taken from the radio signal. An auxiliary audio input module 331, or auxiliary audio interface, may be used to receive the direct wired audio input for sending to the processing unit. In this manner, especially for musician's whose instrument causes vibrations to be felt within the body or the head of the musician, the problem of interference between the vibrations or sound received directly from the instrument and a the vibrations or sound received via a version of his or her instrument's sound arriving at the ear with a delay due to the wireless communications network is addressed because the direct hard-wired connection of the instrument's output to the mixer equipment substantially reduces such delay to a point where the musician is not affected. For in-ear monitoring, musicians generally can play without being affected by delays between the direct production of their own sound and the reproduction of their own sound in the ear monitor when the delay is less than about 1 ms. It is common for such delays to be well over 1 ms or 2 ms, and sometimes over 10 ms, in a standard wireless in-ear monitoring system which is not configured according to some embodiments. With delays of between 1 ms and 5 ms the musician may still be able to play but the tone colour is noticeably different and may affect the musician's performance. When the delay is greater than 5 ms playing becomes difficult. Playing is generally considered to be impossible for delays of above 10 ms.

The change in tone colour mentioned above is a known problem, caused by a comb filter effect due to the phase difference, or delay, between the vibrations generated in the musician's head or body by the sound produced by the instrument and the sound that is returned to the musician's in-ear monitor. This problem may be addressed by reducing the latency in the wireless transmission, which means investing in a high-quality wireless electronics design. Solutions based on the development of high-fidelity wireless electronics always result in a significant increase in the cost of the equipment. Furthermore, the best and most expensive systems can generally only attain latencies in the order of 1 ms to 2 ms. Embodiments of the present invention provide for latencies which are well below the best wireless systems, thus eliminating the comb filter effect without the otherwise associated increase in cost.

Embodiments of the present invention do not require a central mixing desk to provide pre-mixed or mixed audio signals from the sources back to the musicians. Instead, each musician's monitor system, or assembly, is configured to receive every other musician's audio signals directly from their own personal monitoring systems and the mixing is performed by the musicians themselves using their monitoring systems. The mixing in one assembly is done using the signals from the other assemblies, decoded from the radio broadcast, and the direct input of the signal from the musician's own instrument. In order not to produce an echo, it is arranged, according to different embodiments, for the musician's own sound not to be taken from the radio signal. In one embodiment, this follows from the time-slot arrangement of the communications protocol for the radio broadcast, where a receiver receives the other signals during certain time slots and transmits its own signal in another time slot. In other embodiments, for example where the communications protocol involves using separate frequency bands or separate code slots for the different instruments' audio signals, the system is configured to filter out the musician's own instrument from the received radio broadcast. The personalised audio processing assemblies of the present invention comprise a communications controller to control the input interface and the output interface to operate according to a chosen communications protocol. This effectively provides a means for filtering the audio signal from the user's own instrument from the plurality of audio signals received in the radio broadcast signal. By arranging for the filtering to be done at each user's own personalised audio processing assembly, it is possible for the assembly to be used within networks using wireless protocols where all communications modules, or personalised audio processing assemblies, involved receive a common signal comprising all of the signals from all of the participating communications modules, at least when a sufficiently large sample of the broadcast is captured. The common signal may be called a broadcast signal since all communications modules receive the same common signal. As mentioned above, this leads to a higher quality and more robust audio output to the user when compared to systems which use a packet switched based network. This also avoids for any overhead when adding further communications modules, or personal audio processing assemblies, to the system, since each communications module on the network need not be aware of how the rest of the communications modules are configured or how many of them are on the network. This type of broadcast channel is different from a packet-based broadcast channel or network, where the destination or channel of a data packet is comprised within that data packet, thus making it easy to determine to which channel the data belongs.

Thanks to the direct input of the musician's own instrument's sound to the mixing process, the sound of the musician's own instrument in the mix will not be delayed with respect to the sound of the musician's own instrument which resonates in the musician's head or body and the musician will be able to play unhindered. The sounds of the rest of the instruments, which are taken from the radio broadcast, may be delayed due to latencies within the wireless communications system, however, these delays will neither hinder the musician from playing nor prevent the musician from playing in time with the rest of the musicians because the ear is more tolerant to this type of delay. Up to 20 ms of delay is acceptable for the audio signals from the other instruments. In certain conditions, delays of around 10 ms may begin to cause a problem which may be described as a "lip-synching" problem. In a studio environment, with musicians being acoustically isolated but having visual contact, if one musician is facing a singer, for example, and hearing the singer's voice in the monitor with around 10 ms of delay, then the musician might notice the singer's lips moving out of synch with the voice in the monitor. A simple remedy for this is for the musician simply not to look at the singer's mouth while playing. The system may also be used in a live situation, such as a practice session for example. Although satisfactory monitoring is provided to all musicians in the practice situation, the best results are achieved for example when a singer or wind instrumentalist plays with musicians whose instruments provide electronic audio signal outputs rather than acoustic audio outputs due to the preferred isolation scenario that this situation provides.

A control interface module may be provided in the system for receiving control parameters for controlling the settings of the mixer or processor. The control parameters may be provided using appropriate buttons, knobs, sliders or softbuttons provided on the mixer and accessible to the musician. Alternatively, the musician may use a mobile wireless device (150, 250) to send the control parameters to the mixer via the control interface module, preferably using a short-range communications protocol.

The invention claimed is:

1. A personal audio processing assembly for processing a plurality of audio signals from a plurality of sources, the plurality of audio signals including wireless broadcast audio signals and at least one direct audio signal from the user via at least one wired connection, and for providing a combined audio output signal to a user, the personal audio processing assembly, comprising:
   a wireless receiver for receiving the wireless broadcast audio signals;

an auxiliary audio interface configured to receive via a wired input the at least one direct audio signal from the user;

a wireless transmitter configured to transmit the at least one direct audio input signal to at least one other user as a part of the wireless audio signals;

a communications controller configured to control at least the wireless receiver and the wireless transmitter according to a pre-determined communications protocol, the communications controller further configured to control the wireless receiver to exclude the at least one direct audio input signal transmitted by the wireless transmitter from the audio signals sent to the processor by the wireless receiver;

a processor configured to process the audio signals from the wireless receiver and the auxiliary audio interface according to one or more received control instructions to provide a processed output that includes the at least one direct audio input signal and audio signals received wireless from other sources; and an audio output interface configured to provide the processed output as the combined audio output signal to the user.

2. The personal audio processing assembly according to claim 1, the personal audio processing assembly further comprising a control interface for receiving the one or more control instructions.

3. The personal audio processing assembly according to claim 1, wherein the wireless broadcast audio signals are modulated according to a time division multiple access protocol having a plurality of time slots, or an impulse radio protocol having a plurality of time-slots, the communications controller being configured to control the wireless transmitter to transmit the audio signals received by the auxiliary audio interface during pre-determined time-slots, and the communications controller being configured to control the wireless receiver to pass only the audio signals received during remaining time-slots other than the pre-determined time-slots, thereby excluding the at least one direct audio input signal transmitted via the output interface.

4. The personal audio processing assembly according to claim 1, wherein the radio broadcast signal is modulated according to a frequency division multiple access protocol or a code division multiple access protocol, and wherein the communications controller is configured to control a filter connected to the wireless receiver to exclude signals with codes or frequencies used by the transmitter to transmit the at least one direct audio input signal.

5. The personal audio processing assembly according to claim 2, further comprising a hardware input to receive the control instructions for the control interface.

6. The personal audio processing assembly according to claim 2, wherein the control interface is configured to receive the control instructions via a wireless channel from a portable controller device.

7. The personal audio processing assembly according to claim 2, wherein the control interface is configured to receive the control instructions as a part of the wireless broadcast audio signals.

8. The personal audio processing assembly according to claim 1, wherein at least one of the plurality of sources is an electronic source of audio signals or a transducer for an acoustic source of audio signals, at least a part of the output interface being a part of the electronic source or the transducer.

9. The personal audio processing assembly according to claim 1, further comprising an earplug or headset for presenting the combined audio output signal to the user, the processor and/or the audio output interface being a part of the earplug or headset.

10. The personal audio processing assembly according to claim 2, wherein the processor and/or the control interface is housed in a portable module.

11. The personal audio processing assembly according to claim 2, wherein the input interface, the output interface, the processor, the communications controller, the audio output interface and the control interface are housed in a single portable housing.

12. A system for providing each member of a group of musicians with a capability of receiving, mixing and hearing a combination of audio signals from every other member of the group and his or her own instrument, the system comprising, for each member, a personal audio processing assembly according to claim 1.

13. A method for providing a personalized mix of a plurality of audio signals from a plurality of sources, the method using a personalized audio processing assembly according to claim 1, the method comprising:

receiving mixing instructions from a user; and mixing in the processor the plurality of audio signals based on the mixing instructions from the user, the wireless broadcast audio signals being received on a plurality of data channels, each data channel comprising audio content from one of the sources;

wherein said at least one direct audio input signal transmitted by the wireless transmitter is excluded from the audio signals processed by the processor to provide the processed output to the user as the combined audio output signal.

14. The method of claim 13, wherein the wireless broadcast audio signals are modulated according to a frequency division multiple access protocol or a code division multiple access protocol, the method further comprising excluding signals with codes or frequencies used by the transmitter to transmit the at least one direct audio input signal from the signals processed by the processor.

15. The method of claim 13, wherein the wireless broadcast audio signals are modulated according to a frequency division multiple access protocol or a code division multiple access protocol, further comprising filtering the wireless broadcast audio signals using a frequency or a code according to the protocol to exclude the at least one direct audio input signal transmitted via transmitter.

* * * * *